(12) United States Patent
Bara et al.

(10) Patent No.: US 9,873,505 B2
(45) Date of Patent: Jan. 23, 2018

(54) FLY-BY-WIRE CONTROL SYSTEM FOR AIRCRAFT

(71) Applicants: Sagem Défense Sécurité, Boulogne-Billancourt (FR); Airbus Helicopters, Marignane (FR)

(72) Inventors: Cédric Bara, Boulogne-Billancourt (FR); Christophe Tuzi, Boulogne-Billancourt (FR); Eric Bourgogne, Boulogne-Billancourt (FR); Pascal Coppee, Boulogne-Billancourt (FR); Yann Vandenbaviere, Boulogne-Billancourt (FR)

(73) Assignees: Airbus Helicopters, Marignane (FR); Sagem Defense Securite, Boulogne-Billancourt (FR)

( * ) Notice: Subject to any disclaimer, the term of this patent is extended or adjusted under 35 U.S.C. 154(b) by 0 days.

(21) Appl. No.: 14/898,052

(22) PCT Filed: Jun. 10, 2014

(86) PCT No.: PCT/FR2014/051399
§ 371 (c)(1),
(2) Date: Dec. 11, 2015

(87) PCT Pub. No.: WO2014/199070
PCT Pub. Date: Dec. 18, 2014

(65) Prior Publication Data
US 2016/0122003 A1    May 5, 2016

(30) Foreign Application Priority Data
Jun. 12, 2013  (FR) .................................. 13 55455

(51) Int. Cl.
*B64C 13/50*     (2006.01)
*G05D 1/00*      (2006.01)

(52) U.S. Cl.
CPC ......... *B64C 13/503* (2013.01); *G05D 1/0077* (2013.01)

(58) Field of Classification Search
None
See application file for complete search history.

(56) References Cited

U.S. PATENT DOCUMENTS

| 7,877,627 B1 | 1/2011 | Freydel |
| 2005/0085957 A1 | 4/2005 | Yeh |
| 2006/0100750 A1 | 5/2006 | Platzer |

OTHER PUBLICATIONS

International Search Report dated Feb. 20, 2015, issued in corresponding International Application No. PCT/FR2014/051399, filed Jun. 10, 2014, 2 pages.

(Continued)

*Primary Examiner* — Mussa A Shaawat
*Assistant Examiner* — Kyung Kim
(74) *Attorney, Agent, or Firm* — Christensen O'Connor Johnson Kindness PLLC (57) ABSTRACT

The invention relates to a fly-by-wire system which comprises: three-stage piloting control, each stage including a control computer suitable for determining the positions of the stick, and a monitoring computer capable of verifying all the pre-determined positions of the stick; three-stage control-surface position calculation, each stage including a control computer suitable for calculating the control-surface positions from encoded positions of the stick, and a monitoring computer capable of verifying all the calculated control-surface positions; a single unidirectional communication link connecting the control computer of the first piloting control stage to the control computer of the first control-surface position calculation stage; a single unidirectional communication link connecting the control computer of the second piloting control stage to the control computer of the second control-surface position calculation stage; and (Continued)

a single unidirectional communication link connecting the control computer of the third piloting control stage to the control computer of the third control-surface position calculation stage.

28 Claims, 3 Drawing Sheets

(56) References Cited

OTHER PUBLICATIONS

Written Opinion of the International Searching Authority, issued in corresponding International Application No. PCT/FR2014/051399, filed Jun. 10, 2014, 8 pages.

FLY-BY-WIRE CONTROL SYSTEM FOR AIRCRAFT

The invention relates to a fly-by-wire control system for aircraft.

Fly-by-wire control systems are being progressively implemented in more and more airplanes. The first fly-by-wire control systems were duplicated by a backup manual control system of mechanical controls allowing for a manual landing in case of failure of the fly-by-wire control system. But, this manual control system is bulky and heavy such that manufacturers are today designing aircraft that no longer comprise such a backup manual control system.

In this context, it is essential that the fly-by-wire control systems have a high safety level. In order to guarantee this safety level, redundant processors are implemented and the communication links are duplicated.

Figure 1:
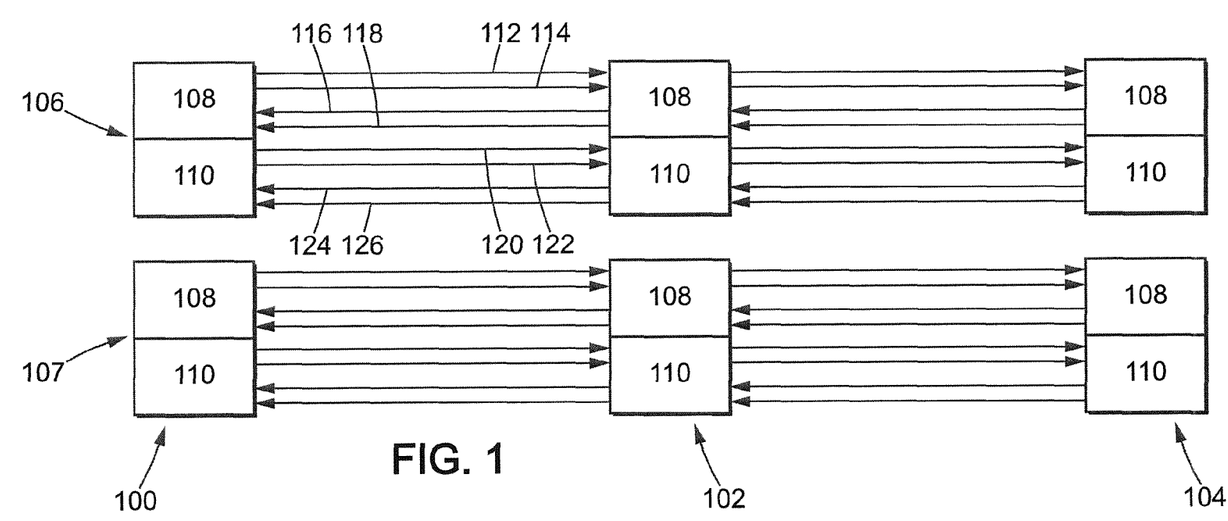
FIG. 1 is a schematic representation of the fly-by-wire control system according to the state-of-the-art.

For example, a known fly-by-wire control system is shown in FIG. 1. It includes a piloting control 100 suited to determine the positions of the direction stick, a position calculation for the flight-control surfaces 102 capable of determining the positions of the aerodynamic flight-control surfaces according to the position of the stick and an actuators control 104 appropriate for calculating commands for driving aerodynamic flight-control surface actuators based on the positions of the aerodynamic flight-control surfaces.

To correct a possible malfunction of a calculation processor, the piloting control 100, the position calculation for the flight-control surfaces 102 and the actuators control 104 each comprise two stages 106, 107. Each stage 106, 107 is made up of a main processor, called control processor 108, and a secondary processor, called monitoring processor 110, suited to verify the reliability the calculations done by the control processor 180. In case of failure of one of the control processors 108 from the first stage 106 of the piloting control 100, the position calculation for the flight-control surfaces 102 or the actuators control 104, the control processors 108 and the monitoring processors 110 from the first stage 106 put themselves in failure and all the calculations are done by the control processors 108 and the monitoring processors 110 from the second stage 107.

In order to assure the integrity the information transmitted between the processors, the processes are connected to each other by unidirectional communication links or simplex links. Additionally, each of these communication links is duplicated in order to be able to verify that the data were not truncated or modified during the transmission thereof.

In that way, the control processor 108 from the first stage 106 of the piloting control 100 is connected to the control processor 108 from the first stage 106 of the position calculation for the flight-control surfaces 102 by four unidirectional communication links 112, 114, 116, 118: two of them are used to transfer data, in one direction, from the control processor 108 of the piloting control 100 towards the control processor 108 of the trajectory calculation 102, and the other two are used to transfer data in the opposite direction, from the control processor 108 of the trajectory calculation 102 towards the control processor 108 of the piloting control 100.

Similarly, and for the same reasons, the monitoring processor 110 from the first stage 106 of the piloting control 100 is connected to the monitoring processor 110 of the first stage 106 of the trajectories calculation 102 by four communication links 120, 122, 124, 126.

This cabling network is repeated between both the control processor 108 and the monitoring processor 110 of the second stage 107 of the piloting control and also the control processors 108 and the monitoring processors 110 of the second stage 107 of the position calculation for the flight-control surfaces and also likewise between the control processors 108 and the monitoring processors 110 of the first 106 and second 107 stages of the position calculation for the flight-control surfaces and the control processors 108 and the monitoring processors 107 of the first 106 and second 107 stages of the actuators control.

Such a fly-by-wire control system has significant mass and volume.

A goal of the present invention is to design a more secure fly-by-wire control system which additionally has a lower mass and volume. In particular, it would be desirable to design a control system having an integrity level of at least $10^{-10}$ and an availability level of at least $10^{-10}$.

For this purpose, a goal of the invention is a fly-by-wire control system for aircraft comprising aerodynamic flight-control surfaces and a stick for piloting said aerodynamic flight-control surfaces systems, said control system comprising:

a piloting control comprising a first stage and a second stage each comprising:
  a control computer appropriate for determining the positions of the stick, where said control computer comprises an encoder appropriate for generating encoded stick positions, and
  a monitoring computer suited to verify the integrity of the stick positions determined by the control computer;
a position calculation for the flight-control surfaces comprising a first stage and the second stage, each comprising:
  a control computer appropriate for calculating positions of the flight-control surfaces using encoded stick positions; and
  a monitoring computer suited to verify the integrity of the positions of the flight-control surfaces calculated by the control computer;
a unidirectional link for piloting controls, referred to as first main piloting link, connecting the control computer for the first stage of the piloting control to the control computer for the first stage of the position calculation for the flight-control surfaces;
a unidirectional link for piloting controls, referred to as second main piloting link, connecting the control computer for the second stage of the piloting control to the control computer for the second stage of the position calculation for the flight-control surfaces;
characterized in that the piloting control comprises a third stage including:
  a control computer appropriate for determining the positions of the stick and, where said control computer comprises an encoder appropriate for generating encoded stick positions;
  a monitoring computer suited to verify the integrity of the stick positions determined by the control computer;
and in that the position calculation for the flight-control surfaces comprises:
  a control computer appropriate for calculating positions of the flight-control surfaces using encoded stick positions; and
  a monitoring computer suited to verify the integrity of the positions of the flight-control surfaces calculated by the control computer;

and in that the control system comprises a unidirectional link for piloting controls, referred to as third main piloting link, connecting the control computer for the third stage of the piloting control to the control computer for the third stage of the position calculation for the flight-control surfaces;

and in that the first main piloting link is the only control link appropriate for sending encoded stick positions from the control computer for the first stage of the piloting control to the control computer for the first stage of the position calculation for the flight-control surfaces;

where the second main piloting link is the only control link appropriate for sending encoded stick positions from the control computer for the second stage of the piloting control to the control computer for the second stage of the position calculation for the flight-control surfaces;

where the third main piloting link is the only control link appropriate for sending encoded stick positions from the control computer for the third stage of the piloting control to the control computer for the third stage of the position calculation for the flight-control surfaces;

where the monitoring computer for the first stage, the monitoring computer for the second stage and the monitoring computer for the third stage of the position calculation for the flight-control surfaces are connected respectively to said first, second and third main piloting links, via control links;

and in which the monitoring computers for the piloting control each comprise one encoder appropriate for decoding the encoded stick positions; where the monitoring computers for the first stage, second stage and third stage of the piloting control are connected respectively to said first, second and third main piloting links via control links; where the monitoring computers for the piloting control are appropriate for verifying the integrity of the stick positions decoded by said encoders.

Advantageously, such a fly-by-wire control system has an integrity level of at least $10^{-10}$ and an availability level of at least $10^{-10}$ such that there is no need to be duplicated by a manual control system.

Furthermore, the use of only four unidirectional main links between the control computer and the monitoring computer for the first stage of the piloting control and the control computer and the monitoring computer for the first stage of the position calculation for the flight-control surfaces, instead of eight communication links according to the state-of-the-art, serves to considerably reduce the volume and mass of the fly-by-wire control system. Reducing the number of communication links also serves to reduce the cost of the fly-by-wire control system.

Advantageously, the monitoring computer verifies that no error has been introduced during the encoding of the data.

According to specific embodiments, the fly-by-wire control system comprises one or more of the following features:
the encoders of the control computers for the piloting control and the encoders of the monitoring computers for the piloting control are appropriate for implementing a first cyclic redundancy check on a first data packet representative of said stick positions and a second cyclic redundancy check on a second data packet representative of said stick positions, where said second data packet comprises several first data packets.
it comprises:
a single unidirectional control link for piloting, referred to as first auxiliary link for piloting, appropriate for sending the encoded stick positions from the control computer for the first stage of the piloting control to the control computer for the second stage of the position calculation for the flight-control surfaces;
a single unidirectional control link for piloting, referred to as first backup link for piloting, appropriate for sending the encoded stick positions from the control computer for the first stage of the piloting control to the control computer for the third stage of the position calculation for the flight-control surfaces;
the monitoring computer for the second stage and the monitoring computer for the third stage of the position calculation for the flight-control surfaces are connected respectively to said first auxiliary link for piloting and to said first backup link for piloting by control links;
it comprises:
a single unidirectional control link for piloting, referred to as second auxiliary link for piloting, appropriate for sending the encoded stick positions from the control computer for the second stage of the piloting control to the control computer for the third stage of the position calculation for the flight-control surfaces;
a single unidirectional control link for piloting, referred to as second backup link for piloting, appropriate for sending the encoded stick positions from the control computer for the second stage of the piloting control to the control computer for the first stage of the position calculation for the flight-control surfaces;
the monitoring computer for the third stage and the monitoring computer for the first stage of the position calculation for the flight-control surfaces are connected respectively to said second auxiliary link for piloting and to said second backup link for piloting by control links;
it comprises:
a single unidirectional control link for piloting, referred to as third auxiliary link for piloting, appropriate for sending the encoded stick positions from the control computer for the third stage of the piloting control to the control computer for the first stage of the position calculation for the flight-control surfaces;
a single unidirectional control link for piloting, referred to as third backup link for piloting, appropriate for sending the encoded stick positions from the control computer for the third stage of the piloting control to the control computer for the second stage of the position calculation for the flight-control surfaces;
the monitoring computer for the first stage and the monitoring computer for the second stage of the position calculation for the flight-control surfaces are connected respectively to said third auxiliary link for piloting and to said third backup link for piloting by control links;
the position calculation for the flight-control surfaces is appropriate for receiving actual positions for the flight-control surfaces, where at least one control computer and one monitoring computer for the position calculation for the flight-control surfaces are appropriate for calculating force controls as a function of the received actual positions of the flight-control surfaces, and in that the control system comprises:
a single unidirectional control link for force feedback, referred to as first force feedback link, appropriate for sending said force controls from the control computer for the first stage of the position calculation for the flight-control surfaces to the control computer for the first stage of the piloting control;
a single unidirectional control link for force feedback, referred to as second force feedback link, appropriate for sending said force controls from the control computer for the second stage of the position calculation for the flight-control surfaces to the control computer for the second stage of the piloting control;

a single unidirectional control link for force feedback, referred to as third force feedback link, appropriate for sending said force controls from the control computer for the third stage of the position calculation for the flight-control surfaces to the control computer for the third stage of the piloting control;

the control computers for the position calculation for the flight-control surfaces each comprise one encoder for encoding the force controls, and in that said monitoring computers for the position calculation for the flight-control surfaces each comprise an encoder appropriate for decoding the encoded force controls; where said encoders for the monitoring computers for the first stage, second stage and third stage of the position calculation for the flight-control surfaces are connected respectively to said first, second and third force feedback links via control links; where said monitoring computers for the position calculation for the flight-control surfaces are appropriate for verifying the integrity of the force controls decoded by said encoders;

where the monitoring computer for the first stage of the piloting control, the control computer and the monitoring computer for the second stage of the piloting control, and the control computer and the monitoring computer for the third stage of the piloting control are each connected to said first force feedback link via control links;

where the monitoring computer for the second stage of the piloting control, the control computer and the monitoring computer for the first stage of the piloting control, and the control computer and the monitoring computer for the third stage of the piloting control are each connected to said second force feedback link via control links;

where the monitoring computer for the third stage of the piloting control, the control computer and the monitoring computer for the first stage of the piloting control, and the control computer and the monitoring computer for the second stage of the piloting control are each connected to said third force feedback link via control links.

The goal the invention is also a fly-by-wire control system for aircraft comprising aerodynamic flight-control surfaces, actuators suited to drive said aerodynamic flight-control surfaces based on driving instructions, and a stick appropriate for being moved for piloting the driving of said aerodynamic flight-control surfaces, where the control system comprises:

a position calculation for the flight-control surfaces comprising a first stage and a second stage, each comprising:
 a control computer appropriate for receiving positions from the stick and for calculating positions for the flight-control surfaces based on the positions of the stick, where said control computer comprises an encoder appropriate for generating encoded positions of the flight-control surfaces; and
 a monitoring computer suited to verify the integrity of the positions of the flight-control surfaces calculated by the control computer;

an actuators control comprising a first stage and a second stage each comprising:
 a control computer appropriate for determining driving instructions for the actuators for aerodynamic flight-control surfaces based on the positions of the flight-control surfaces; and a monitoring computer suited to verify the integrity of the driving instructions determined by the control computer;

a unidirectional control link for position of the flight-control surfaces, referred to as first main control link, connecting the control computer for the first stage of the position calculation for the flight-control surfaces to the control computer for the first stage of the actuators control;

a unidirectional control link for position of the flight-control surfaces, referred to as second main control link, connecting the control computer for the second stage of the position calculation for the flight-control surfaces to the control computer for the second stage of the actuators control;

characterized in that the position calculation for the flight-control surfaces comprises a third stage including:
 a control computer appropriate for receiving positions from the stick and for calculating positions for the flight-control surfaces based on the positions of the stick, where said control computer comprises an encoder appropriate for generating encoded positions of the flight-control surfaces;
 a monitoring computer suited to verify the integrity of the positions of the flight-control surfaces calculated by the control computer;

and in that the actuators control comprises:
 a control computer appropriate for calculating driving instructions based on encoded positions of the flight-control surfaces; and
 a monitoring computer suited to verify the integrity of the driving instructions calculated by the control computer;

and in that the control system comprises
 a unidirectional control link for position of the flight-control surfaces, referred to as third main control link, connecting the control computer for the third stage of the position calculation for the flight-control surfaces to the control computer for the third stage of the actuators control;

and in that the first main control link is the only control link appropriate for sending encoded positions of the flight-control surfaces from the control computer for the first stage of the position calculation for the flight-control surfaces to the control computer for the first stage of the actuators control;

where the second main control link is the only control link appropriate for sending encoded positions of the flight-control surfaces from the control computer for the second stage of the position calculation for the flight-control surfaces to the control computer for the second stage of the actuators control;

where the third main control link is the only control link appropriate for sending encoded positions of the flight-control surfaces from the control computer for the third stage of the position calculation for the flight-control surfaces to the control computer for the third stage of the actuators control;

where the monitoring computers for the first stage, second stage and third stage of the position calculation for the flight-control surfaces are each connected respectively to said first, second and third control links via control links for receiving encoded positions of the flight-control surfaces;

where the monitoring computers for the position calculation for the flight-control surfaces each comprise an encoder appropriate for decoding the encoded positions of the flight-control surfaces;

where the monitoring computers for the position calculation for the flight-control surfaces are appropriate for verifying the integrity of the positions of the flight-control surfaces decoded by said encoders.

According to specific embodiments, the fly-by-wire control system comprises one or more of the following features:

the encoders of the control computer for the position calculation for the flight-control surfaces and the encoders of the monitoring computer for the actuators are appropriate for implementing a first cyclic redundancy check on a first data packet representative of said stick positions and a second cyclic redundancy check on a second data packet representative of said stick positions, where said second data packet comprises several first data packets.

it comprises:

a single unidirectional control link, referred to as first auxiliary control link, appropriate for sending the encoded positions of the flight-control surfaces from the control computer for first stage of the position calculation for the flight-control surfaces to the control computer for the second stage of the actuators control;

a single unidirectional control link, referred to as first backup control link, appropriate for sending the encoded positions of the flight-control surfaces from the control computer for first stage of the position calculation for the flight-control surfaces to the control computer for the third stage of the actuators control;

the monitoring computer for the second stage and the monitoring computer for the third stage of the actuators control are connected respectively to said first auxiliary control link and to said first backup control link via control links;

it comprises:

a single unidirectional control link, referred to as second auxiliary control link, appropriate for sending the encoded positions of the flight-control surfaces from the control computer for the second stage of the position calculation for the flight-control surfaces to the control computer for the third stage of the actuators control;

a single unidirectional control link, referred to as second backup control link, appropriate for sending the encoded positions of the flight-control surfaces from the control computer for the second stage of the position calculation for the flight-control surfaces to the control computer for the first stage of the actuators control;

the monitoring computer for the third stage and the monitoring computer for the first stage of the actuators control are connected respectively to said second auxiliary control link and to said second backup control link via control links;

it comprises:

a single unidirectional control link, referred to as third auxiliary control link, appropriate for sending the encoded positions of the flight-control surfaces from the control computer for the third stage of the position calculation for the flight-control surfaces to the control computer for the first stage of the actuators control;

a single unidirectional control link, referred to as third backup control link, appropriate for sending the encoded positions of the flight-control surfaces from the control computer for the third stage of the position calculation for the flight-control surfaces to the control computer for the second stage of the actuators control;

the monitoring computer for the first stage and the monitoring computer for the second stage of the actuators control are connected respectively to said third auxiliary control link and to said third backup control link via control links;

the control computers and the monitoring computers for the first, second and third stages of the actuators control are appropriate for determining actual positions of the flight-control surfaces, and the control system comprises:

one single unidirectional control link for feedback from actuators, referred to as first main link for feedback from actuators, appropriate for sending said actual positions of the flight-control surfaces from the control computer for the first stage of the actuators control to the control computer for the first stage of the position calculation for the flight-control surfaces;

one single unidirectional control link for feedback from actuators, referred to as second main link for feedback from actuators, appropriate for sending said actual positions of the flight-control surfaces from the control computer for the second stage of the position calculation for the flight-control surfaces to the control computer for the second stage of the actuators control;

one single unidirectional control link for feedback from actuators, referred to as third main link for feedback from actuators, appropriate for sending said actual positions of the flight-control surfaces from the control computer for the third stage of the actuators control to the control computer for the third stage of the position calculation for the flight-control surfaces;

the control computers for the actuators control each comprise one encoder appropriate for generating encoded positions of the flight-control surfaces and in that the monitoring computers for the first stage, second stage and third stage of the actuators control are connected respectively to said first, second and third main links for feedback from actuators via control links; the monitoring computers for the actuators control each comprise an encoder appropriate for decoding the encoded actual positions of the flight-control surfaces; where the monitoring computers for the actuators control are appropriate for verifying the integrity of the actual positions of the flight-control surfaces decoded by said encoders, the monitoring computer for the first stage of the position calculation for the flight-control surfaces is connected to said first main link for feedback from actuators via a control link;

the monitoring computer for the second stage of the position calculation for the flight-control surfaces is connected to said second main link for feedback from actuators via a control link;

the monitoring computer for the third stage of the position calculation for the flight-control surfaces is connected to said third main link for feedback from actuators via a control link;

it comprises:

one single unidirectional control link for feedback from actuators, referred to as first auxiliary link for feedback from actuators, appropriate for sending the encoded actual positions of the flight-control surfaces from the control computer for the first stage of the actuators control to the control computer for the second stage of the position calculation for the flight-control surfaces;

one single unidirectional control link for feedback from actuators, referred to as first backup link for feedback from actuators, appropriate for sending the encoded actual positions of the flight-control surfaces from the control computer for the first stage of the actuators control to the control computer for the third stage of the position calculation for the flight-control surfaces;

the monitoring computer for the second stage and the monitoring computer for the third stage of position calculation for the flight-control surfaces are connected respectively to said first auxiliary link for feedback from actuators and to said first backup link for feedback from actuators via control links;

it comprises:

one single unidirectional control link for feedback from actuators, referred to as second auxiliary link for feedback from actuators, appropriate for sending the encoded actual positions of the flight-control surfaces from the control computer for the second stage of the actuators control to the control computer for the third stage of the position calculation for the flight-control surfaces;

one single unidirectional control link for feedback from actuators, referred to as second backup link for feedback from actuators, appropriate for sending the encoded actual positions of the flight-control surfaces from the control computer for the second stage of the actuators control to the control computer for the first stage of the position calculation for the flight-control surfaces;

the monitoring computer for the third stage and the monitoring computer for the first stage of position calculation for the flight-control surfaces are connected respectively to said second auxiliary link for feedback from actuators and to said second backup link for feedback from actuators by control links;

it comprises:

one single unidirectional control link for feedback from actuators, referred to as third auxiliary link for feedback from actuators, appropriate for sending the encoded actual positions of the flight-control surfaces from the control computer for the third stage of the actuators control to the control computer for the first stage of the position calculation for the flight-control surfaces;

one single unidirectional control link for feedback from actuators, referred to as third backup link for feedback from actuators, appropriate for sending the encoded actual positions of the flight-control surfaces from the control computer for the third stage of the actuators control to the control computer for the second stage of the position calculation for the flight-control surfaces;

the monitoring computer for the first stage and the monitoring computer for the second stage of position calculation for the flight-control surfaces are connected respectively to said third auxiliary link for feedback from actuators and to said third backup link for feedback from actuators via control links;

The auxiliary links and backup links considerably increase the overall availability of the control system because, for example, in case of malfunction of the control computer for the first stage of the trajectory calculation, only the control computer and the monitoring computer for the first stage of the trajectory calculation are replaced by the control computer and monitoring computer for the second stage of the trajectory calculation. The control system then operates with the control computer and the monitoring computer for the first stage of the piloting control, the control computer and the monitoring computer for the second stage of the position calculation for the flight-control surfaces and the control computer and monitoring computer for the first stage of the actuators control. The system then still allows two failures in the piloting control one failure in the position calculation for the flight-control surfaces and two failures in the actuators control.

Advantageously the use of a cyclic redundancy check on two different data quantities will serve to guarantee the integrity of the transmitted data.

The invention will be better understood upon reading the following description, which is given solely as an example and done with reference to.

Figure 2:
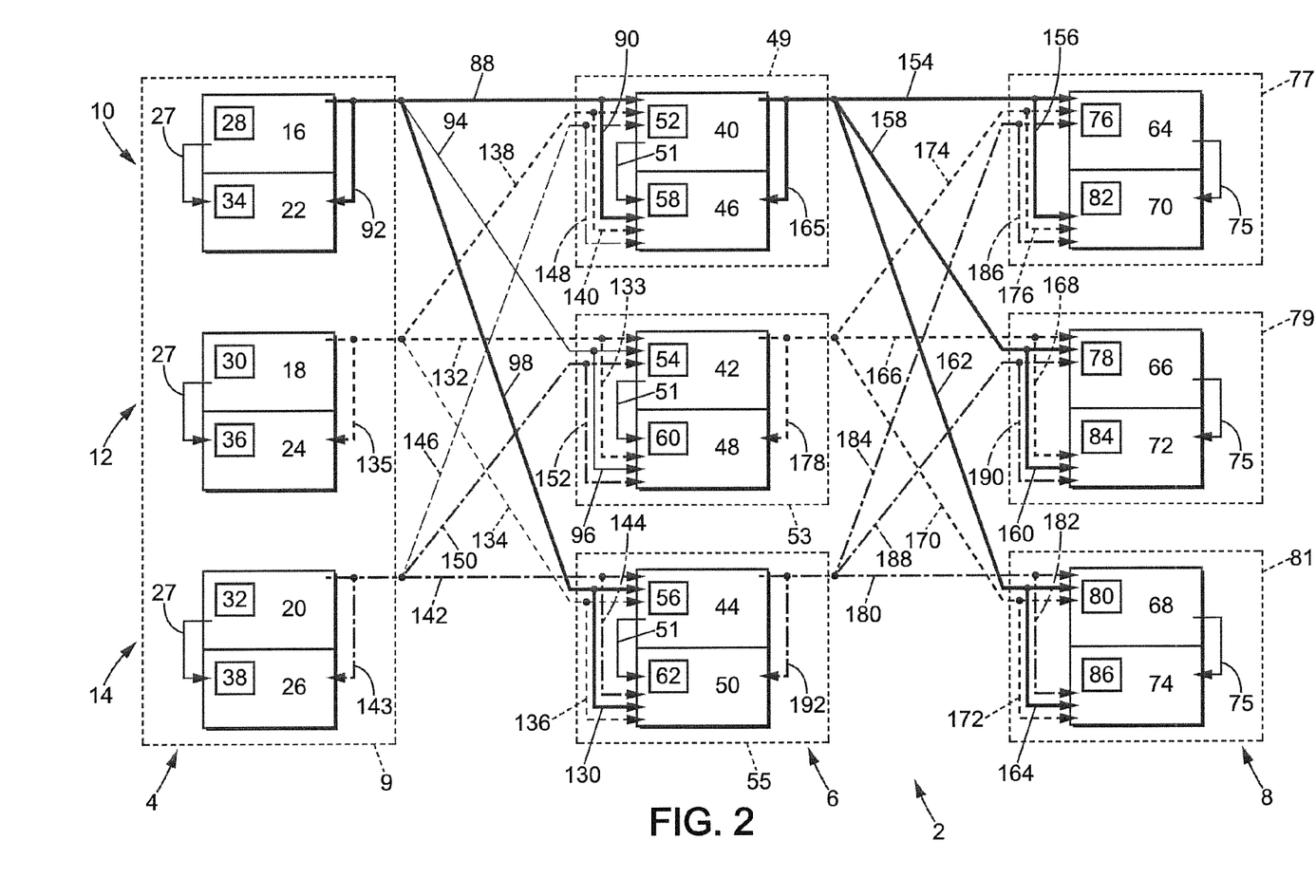
FIG. 2 is a schematic representation of the fly-by-wire control system according to the invention in which only the communication links from the piloting control to the actuators control have been shown.

With reference to FIG. 2, the control system 2 according to the invention comprises one piloting control 4, one position calculation for the flight-control surfaces 6 and one actuators control 8.

The piloting control 4 comprises three stages 10, 12, 14 disposed in a mini stick 9, a stick or a control lever hereafter called stick 9. Each stage 10, 12, 14 comprises a main computer, hereafter called control computer 16, 18, 20 and one redundant computer, hereafter called monitoring computer 22, 24, 26 connected to the control computer for the stage thereof by a communication link 27.

Figure 4:
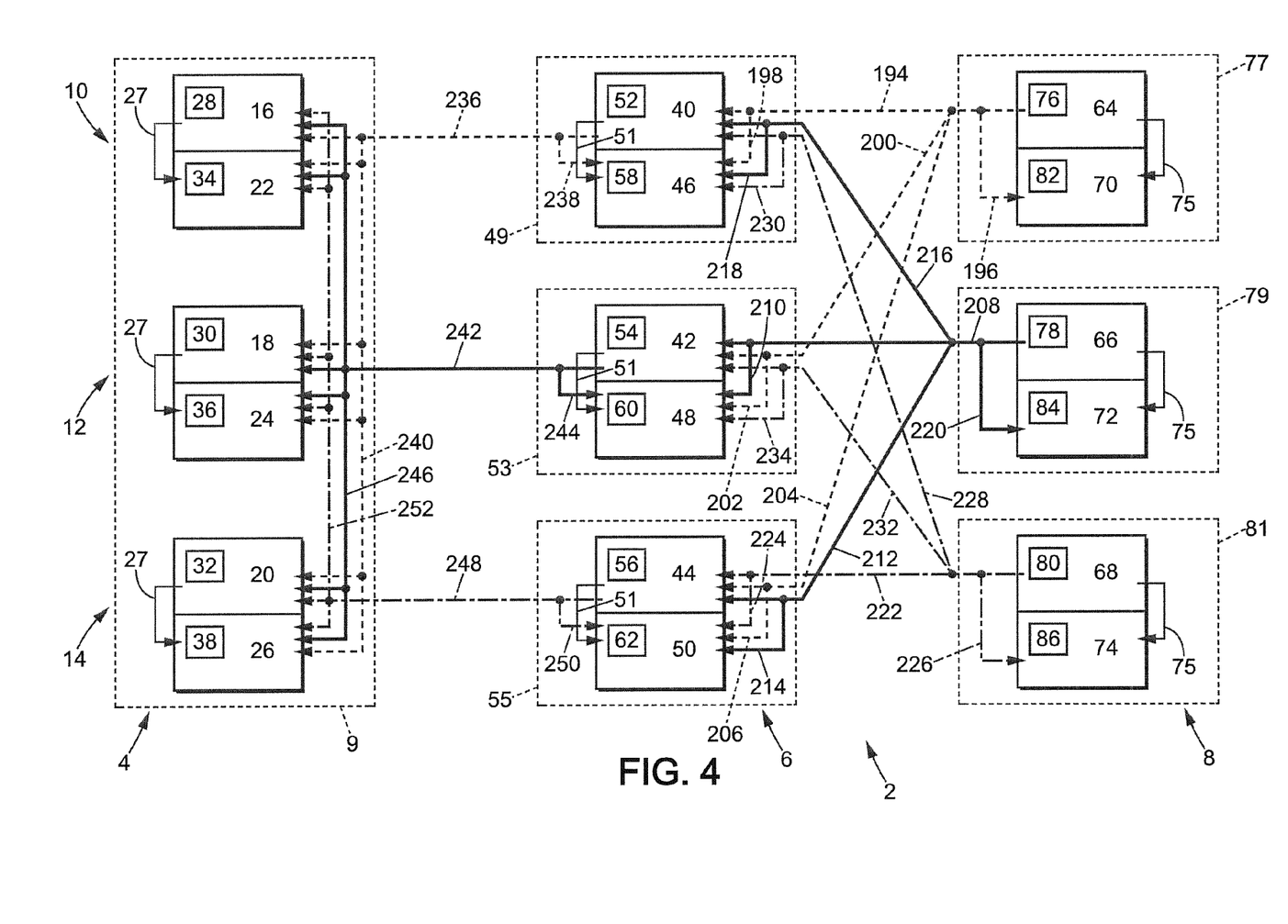
FIG. 4 is a schematic representation of the invention in which only the communication links from the actuators control to the piloting control have been shown.

The control computer 16 and the monitoring computer 22 for the first stage 10 are made up of two printed circuit boards arranged one opposite the other. In general, the set of control computers and monitoring computers represented by two side-by-side rectangles in FIGS. 2 and 4 are made up of two printed circuit boards arranged opposite each other in a single package.

The control computer 16, 18, 20 for each stage are appropriate for determining the positions of the stick according to various position measurements detected by sensors, potentiometers or other. The monitoring computers 22, 24, 26 from each stage are suited for verifying the accuracy of the calculations done by the control computer 16, 18, 20 to which it is connected.

For this purpose, the control computers 16, 18, 20 communicate the stick positions that they have calculated with the monitoring computers 22, 24, 26 via the communication link 27. The monitoring computers 22, 24, 26 determine, for example, the stick positions by using a different determination method than the method used by the control computers 16, 18, 20. Then, the monitoring computers 22, 24, 26 compare the stick positions received over the communication link 27 with the stick positions that they determined themselves. If, for example, the monitoring computer 22 for the first stage 106 of the piloting control detects discrepancies between the received stick positions and those that it determined itself, then the control computer 16 and the monitoring computer 22 for the first stage put themselves into failure. In this case, the control computer 18 and the monitoring computer 24 for the second stage 12 take over and send the stick positions to the position calculation for the flight-control surfaces 6.

The control computers 18, 20 and the monitoring computers 24, 26 for the second and third stage of the piloting control operate in the same way.

Each control computer 16, 18, 20 from the piloting control 4 includes an encoder 28, 30, 34 suited to encode stick positions to be sent to the position calculation for the flight-control surfaces 6 and to decode the force controls received by the position calculation for the flight-control surfaces 6.

Figure 3:
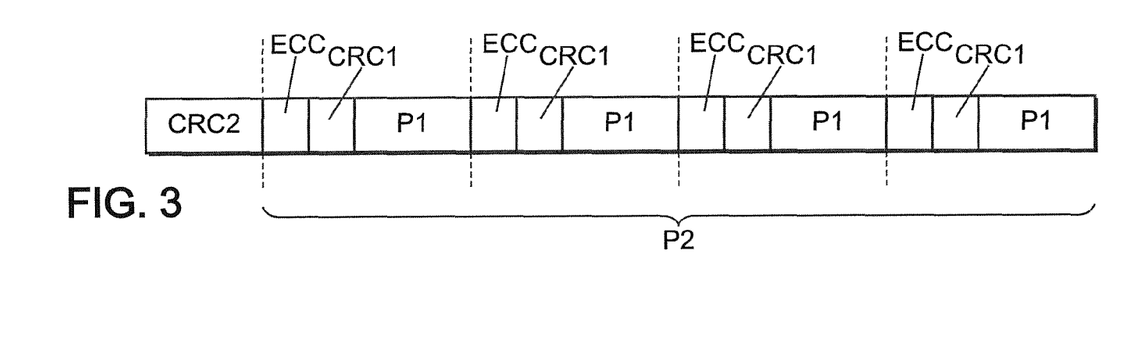
FIG. 3 is a schematic example of encapsulated frames of data.

In particular the encoders 28 to 32 are appropriate for implementing a first cyclic redundancy check on a first data packet P1 and a second cyclic redundancy check on a second data packet P2, where the second data packet P2 comprises several first data packets P1 as shown in FIG. 3 as an example.

The encoders 28 to 32 are also appropriate for implementing an error correcting code intended to correct possible data transmission errors. In that way, during data coding, the encoders 28 to 32 are appropriate for generating a cyclic redundancy check code (CRC1) and an error correction code (ECC) sent after each data packet P1 and a cyclic redundancy code (CRC2) sent after each data packet P2.

During decoding of the data, the encoders 28 to 38 are appropriate for checking the reliability the data using the CRC2 and CRC1 codes and also to possibly correct one or more areas using the ECC codes.

Each monitoring computer 22, 24, 26 comprises an encoder 34, 36, 38 identical to the encoders 28 to 32 and operating in the same way. The encoders 34 to 38 are suited for decoding the stick positions and force controls, as described in detail below.

The coding techniques for correcting codes and cyclic redundancy checks used by the encoders 28 to 38 are encoding techniques generally used for information transmission. They are not described in detail in this patent application and are not the subject matter thereof.

As a variant, other coding techniques with which to provide for data integrity can be used like for example parity check, error detecting codes, error correcting codes, etc.

The position calculation for the flight-control surfaces 6 comprises three stages corresponding to the three stages 10, 12, 14 of the piloting control and which will be referenced by the same references in order to simplify the description.

Each stage 10, 12, 14 of the position calculation for the flight-control surfaces 6 comprises a main computer, referred to as control computer 40, 42, 44 and a redundant computer, called monitoring computer 46, 48, 50 connected to the control computer 40, 42, 44 for the stage thereof by a communication link 51.

The three stages 10, 12, 14 of the position calculation for the flight-control surfaces 6 are generally placed in three different areas of the aircraft because of the significant bulk thereof. Thus, the control computer 40 and the monitoring computer 46 are both printed circuit boards opposite each other in a single package 49. Thus, the control computer 42 and the monitoring computer 48 are both printed circuit boards opposite each other in another package 53. Thus, the control computer 44 and the monitoring computer 50 are both printed circuit boards opposite each other in a last package 55.

The control computers 40, 42, 44 are suited for calculating the flight trajectories according to the stick positions determined by the piloting control 4. The monitoring computers 46, 48, 50 are suited for verifying the integrity of the flight trajectories calculated by the control computers 40, 42, 44 from the stage thereof, in the same way as that described for the monitoring computers for the piloting control 4.

The control computers 40, 42, 44 and the monitoring computers 46, 48, 50 for each stage of the position calculation for the flight-control surfaces 6 each comprise an encoder 52, 54, 56, 58, 60, 62 identical to the encoders 28 to 38 and which will not be described again in detail. The encoders 52 to 56 are appropriate for decoding the stick positions and the positions of the flight-control surfaces and for encoding the positions of the flight-control surfaces and the force controls. The encoders 58 to 62 are appropriate for decoding the stick positions and the requested positions of the flight-control surfaces, the actual positions of the flight-control surfaces and for encoding the positions of the flight-control surfaces and the force controls.

The control computer 40 and the monitoring computer 46 from the first stage are also connected to the control computer 42 and the monitoring computer 48 from the second stage and also to the control computer 44 and to the monitoring computer 50 of the third stage 14 in order to send them synchronization data by communication links not shown in FIG. 2.

The actuators control 8 also comprises three stages corresponding to the three stages of the piloting control 4 and bearing the same references 10, 12, 14. In the same way, each stage 10, 12, 14 of the actuators control 8 comprises a main computer, referred to as control computer 64, 66, 68 and one redundant computer, called monitoring computer 70, 72, 74 connected to the control computer for the stage thereof by a communication link 75. The three stages of the actuators control are positioned in different areas of the aircraft. The control computer 64 and the monitoring computer 70 are both printed circuit boards opposite each other in the same package 77. The control computer 66 and the monitoring computer 72 are both printed circuit boards opposite each other in another package 79. The control computer 68 and the monitoring computer 74 are both printed circuit boards opposite each other in a last package 81.

The control computers 64, 66, 68 are appropriate for calculating instructions for driving the actuators of the aerodynamic flight-control surfaces as a function of the flight trajectories calculated by the position calculation for the flight-control surfaces 6. The monitoring computers 70, 72, 74 for the three stages of the actuators control 8 operate in the same way as the monitoring computers for the three stages of the piloting control 4 and the operation thereof will not be described again in detail. In particular, each monitoring computer 70, 72, 74 is appropriate for verifying the integrity of the driving instructions calculated by the control computer for the stage thereof.

The control computers 64, 66, 68 and the monitoring computers 70, 72, 74 for each of the three stages of the actuators control 8 each comprise an encoder 76, 78, 80, 82, 84, 86 identical to the encoders 28 to 32, which will not be described again in detail. The encoders 76 to 80 are appropriate for decoding the flight trajectories sent by the trajectory calculation 6 and for encoding the positions of the flight-control surfaces. The encoders 82 to 86 are appropriate for decoding the requested positions of the flight-control surfaces and the actual positions of the flight-control surfaces.

The communication links with which data are sent from the piloting control 4 to the actuators control 8 are going to be described now.

The control computer 16 is connected to the control computer 40 by a unidirectional piloting controls link, referred to as first main piloting link 88. This main piloting link 88 and also the set of unidirectional control links for the control system according to the invention are implemented using a communication bus.

According to the present patent application, the term unidirectional refers to a channel which transports information in only one direction.

The first main piloting link 88 is appropriate for transporting stick positions 9 from the control computer 16 to the control computer 14.

The monitoring computer 22 for the first stage 10 of the piloting control is connected to the first main piloting link 88 by a control link 92 at a connection point, where said connection point is located between the end of the data calculation, processing and encoding chain and the output from the control computer 16 for the first stage 10 of the piloting control.

The encoder 34 is suited for decoding the stick positions received by the monitoring computer 22 via the control link 92. The monitoring computer 22 is suited for verifying the integrity of the stick positions decoded by the encoder 34. If the decoded stick positions are different from the stick positions sent by the control computer 16 before coding by the communication link 16, then the control computer 16 and the monitoring computer 22 for the first stage 10 of the piloting control put themselves into failure and the control computer 18 and the monitoring computer 24 for the second stage 12 of the piloting control take over.

Advantageously, the control link 92, the encoder 34 and the monitoring computer 22 for the first stage of the piloting command serve to verify the stick positions in a format as sent to the position calculation for the flight-control surfaces in such a way that the entire data calculation and processing chain of the control computer 16 is verified, including the encoding part. In that way, this second verification of the integrity of the data by the monitoring computer 22 assures an additional level of security for the control system according to the invention.

The monitoring computer 46 for the first stage 10 for the position calculation for the flight-control surfaces 6 is connected to the first main piloting link 88 by a control link 90 at a connection point; where said connection is located at a position near the input of the control computer 40. The term "at a position near" means, in the present patent application, that the link is made between the two printed circuit boards located in the same package and that therefore the control link 90 does not extend in the aircraft between two different packages.

In the same way the control link 92 is made either by a cable a few centimeters long extending between the printed circuit boards of the control computer 16 and the monitoring computer 22 or by solder connections between the two printed circuit boards.

Advantageously a single cable i.e. the first main unidirectional piloting link 88, extends in the aircraft between the stick 9 and the package 49 containing the first stage of the trajectory calculation and not two cables 112, 114 as in the control system from the prior art. In that way, the control system according to the invention has a smaller volume and less weight.

The encoder 58 decodes the stick positions received via the control link 90. The monitoring computer 46 for the first stage of the position calculation for the flight-control surfaces uses the positions of the stick decoded by the encoder 58 in order to calculate the flight trajectories. In this way advantageously the monitoring computer 46 for the first stage of the position calculation for the flight-control surfaces receives exactly the same data as the control computer 40 for the first stage of the position calculation for the flight-control surfaces.

The control computer 16 for the first stage of the piloting control is connected to the control computer 42 for the second stage of the position calculation for the flight-control surfaces by a single unidirectional control link, called first auxiliary piloting link 94. The monitoring computer 48 for the second stage of the position calculation for the flight-control surfaces is connected to the first auxiliary piloting link 94 via a control link 96 connected at a connection point, where said connection point is located near the input of the control computer 42 for the second stage of the position calculation for the flight-control surfaces. In that way, the monitoring computer 48 receives the same data as the control computer 42 for the second stage of the position calculation for the flight-control surfaces.

The control computer 16 is appropriate for sending the encoded positions of the stick to the control computer 42 and to the monitoring computer 48 for the second stage of the position calculation for the flight-control surfaces via the first auxiliary piloting link 94.

In the same way, the control computer 16 for the first stage of the piloting control is connected to the control computer 44 for the third stage of the position calculation for the flight-control surfaces via one unidirectional control link, called first backup piloting link 98. The monitoring computer 50 for the third stage of the position calculation for the flight-control surfaces is connected to the first backup piloting link 98 by a control link 130 connected at a connection point, where said connection point is located at a location near the input of the control computer 44 for the third stage of the position calculation for the flight-control surfaces.

The control computer 16 is appropriate for sending the encoded positions of the stick to the control computer 44 and to the monitoring computer 50 for the third stage of the position calculation for the flight-control surfaces via the first backup piloting link 130.

In that way, advantageously, the control 16 and monitoring 22 computers for the first stage of the piloting control are appropriate for sending the encoded positions of the stick to the control 42, 44 and monitoring 48, 50 computers for the second stage and third stage of the position calculation for the flight-control surfaces in case of failure of the first stage computers for the position calculation of the flight-control surfaces.

The connection drawing and the operating mode described above are also used for the control and monitoring computers for the second stage and third stage of the piloting control and will not be described again. Only the links therebetween will be described below.

The control computer 18 for the second stage of the piloting control is connected to the control computer 42 for the second stage of the position calculation for the flight-control surfaces by a single unidirectional control link, called second main piloting link 132.

The monitoring computer 48 for the second stage of the position calculation for the flight-control surfaces is connected to the second main piloting link 132 by a control link 133 connected at a connection point, where said connection point is located near the input of the control computer 42 for the second stage of the position calculation for the flight-control surfaces.

The monitoring computer 24 for the second stage of the piloting control is connected to the second main piloting link 132 by a control link 135 connected at a connection point, where said connection point is located near the output of the control computer 18 for the second stage of the piloting control.

The control computer 18 for the second stage of the piloting control is connected to the control computer 44 for the third stage of the position calculation for the flight-control surfaces by a single unidirectional control link, called second auxiliary piloting link 134.

The monitoring computer 50 for the third stage of the position calculation for the flight-control surfaces is connected to the second auxiliary piloting link 134 by a control link 136 connected at a connection point, where said connection point is located near the input of the control computer 44 for the third stage of the position calculation for the flight-control surfaces.

The control computer 18 for the second stage of the piloting control is connected to the control computer 40 for the first stage of the position calculation for the flight-control surfaces by a single unidirectional control link, called second backup piloting link 138.

The monitoring computer 46 for the first stage of the position calculation for the flight-control surfaces is connected to the second backup piloting link 138 by a control link 140 connected at a connection point, where said connection point is located near the input of the control computer 40 for the first stage of the position calculation for the flight-control surfaces.

The control computer 20 for the third stage of the piloting control is connected to the control computer 44 for the third stage of the position calculation for the flight-control surfaces by a single unidirectional control link, called third main piloting link 142.

The monitoring computer 26 for the third stage of the piloting control is connected to the third main piloting link 142 by a control link 143 at a connection point near the input of the control computer 20.

The monitoring computer 50 for the third stage of the position calculation for the flight-control surfaces is connected to the third main piloting link 142 by a control link 144 connected at a connection point, where said connection point is located near the input of the control computer 44 for the third stage of the position calculation for the flight-control surfaces.

The control computer 20 for the third stage of the piloting control is connected to the control computer 40 for the first stage of the position calculation for the flight-control surfaces via a single unidirectional control link, called third auxiliary piloting link 146.

The monitoring computer 46 for the first stage of the position calculation for the flight-control surfaces is connected to the third auxiliary piloting link 146 via a control link 148 connected at a connection point, where said connection point is located near the input of the control computer 40 for the first stage of the position calculation for the flight-control surfaces.

The control computer 20 for the third stage of the piloting control is connected to the control computer 42 for the second stage of the position calculation for the flight-control surfaces by a single unidirectional control link, called third backup piloting link 150.

The monitoring computer 48 for the second stage of the position calculation for the flight-control surfaces is connected to the third backup piloting link 150 via a control link 152 connected at a connection point, where said connection point is located near the input of the control computer 42 for the second stage of the position calculation for the flight-control surfaces.

The control computers 18, 20 for the second and third stage of the piloting control are appropriate for sending the encoded stick positions to the control and monitoring computers 40 to 50 for the position calculation for the flight-control surfaces by the set of unidirectional control links 132 to 150.

The control computers 40, 42, 44 for the first, second and third stages of position calculation for the flight-control surfaces are appropriate for sending the encoded positions for the flight-control surfaces to the control computers 64, 66, 68 and to the monitoring computers 70, 72, 74 for the first, second and third stages of the actuators control, via unidirectional control links 154 to 188.

The mesh of communication links and also the mode of operation of the control and monitoring computers are identical and have the same advantages as the mesh and mode of operation of the control and monitoring computers described above for data transmission between the piloting control 4 and the position calculation for the flight-control surfaces 6. They will not be described again in detail.

In that way, advantageously, as with monitoring computers 22, 24, 26 from the piloting control, the monitoring computers 46, 48, 50 for the position calculation of the flight-control surfaces execute two verifications of the calculations and processing done by the control computers 40, 42, 44: a first by comparison with the positions the flight-control surfaces sent by the communication links 51 with coding and a second by comparison with the encoded positions of the flight-control surfaces sent by the control links 165, 178, 192.

Advantageously, the control computers for a given stage of the position calculation for the flight-control surfaces are connected with the control computers for other stages of the actuators control by "crossed" communication links.

The monitoring computers 70, 72, 74 of the actuators control receive the same input data as the control computers 64, 66, 68.

The communication links between the position calculation for the flight-control surfaces 6 and the actuators control 8 are described below.

The control computer 40 for the first stage of the position calculation for the flight-control surfaces is connected to the control computer 64 for the first stage of the actuators control by a single unidirectional control link, called first main control link 154. The monitoring computer 70 for the first stage of the actuators control is connected to the first main control link 154 by a control link 156 connected at a connection point, where said connection point is located near the input of the control computer 64 for the first stage of the actuators control.

The control computer 40 for the first stage of the trajectory calculation is connected to the control computer 66 for the second stage of the actuators control by a single unidirectional control link, called first auxiliary control link 158. The monitoring computer 72 for the second stage of the actuators control is connected to the first auxiliary control link 158 by a control link 160 connected at a connection point, where said connection point is located near the input of the control computer 66 for the second stage of the actuators control.

The control computer 40 for the first stage of the position calculation for the flight-control surfaces is connected to the control computer 68 for the third stage of the actuators control via a single unidirectional control link, called first backup control link 162. The monitoring computer 74 for the third stage of the actuators control is connected to the first backup control link 162 via a control link 164 connected at a connection point, where said connection point is located near the input of the control computer 68 for the third stage of the actuators control.

The monitoring computer 46 for the first stage of the position calculation for the flight-control surfaces is connected to the first main control link 154 via a control link 165 connected at a connection point, where said connection point is located near the output of the control computer 40 for the first stage of the position calculation for the flight-control surfaces in order to receive the encoded positions of the flight-control surfaces and verify their integrity.

The control computer 42 for the second stage of the position calculation for the flight-control surfaces is connected to the control computer 66 for the second stage of the actuators control via a single unidirectional control link, called second main control link 166. The monitoring computer 72 for the second stage of the actuators control is connected to the second main control link 166 via a control link 168 connected at a connection point, where said connection point is located near the input of the control computer 166 for the second stage of the actuators control.

The control computer 42 for the second stage of the position calculation for the flight-control surfaces is connected to the control computer 68 for the third stage of the actuators control by a control link, called second auxiliary control link 170. The monitoring computer 74 is connected to the second auxiliary control link 170 via a control link 172 connected at a connection point, where said connection point is located near the input of the control computer 68 for the third stage of the actuators control.

The control computer 42 for the second stage of the position calculation for the flight-control surfaces is connected to the control computer 64 for the first stage of the actuators control via a single position control link for the flight-control surfaces, called second backup control link 174. The monitoring computer 70 for the first stage of the actuators control is connected to the second backup control link 174 via a control link 176 connected at a connection point, where said connection point is located near the input of the control computer 64 for the first stage of the actuators control.

The monitoring computer 48 for the second stage of the position calculation for the flight-control surfaces is connected to the second main control link 166 via a control link 178 connected at a connection point, where said connection point is located near the output of the control computer 42 for the second stage of the position calculation for the flight-control surfaces in order to receive the encoded positions of the flight-control surfaces and verify the integrity thereof.

The control computer 44 for the third stage of the position calculation for the flight-control surfaces is connected to the control computer 68 for the third stage of the actuators control by a single unidirectional control link, called third main control link 180. The monitoring computer 74 is connected to the third main control link 180 via a control link 182 connected at a connection point, where said connection point is located near the input of the control computer 68 for the third stage of the actuators control.

The control computer 44 for the third stage of the position calculation for the flight-control surfaces is connected to the control computer 64 for the first stage of the actuators control via a single unidirectional control link, called third auxiliary control link 184. The monitoring computer 70 for the first stage of the actuators control is connected to the third auxiliary control link 184 via a control link 186 connected at a connection point, where said connection point is located near the input of the control computer 64 for the first stage of the actuators control.

The control computer 44 for the third stage of the position calculation for the flight-control surfaces is connected to the control computer 66 for the second stage of the actuators control via a single unidirectional control link, called third backup control link 188. The monitoring computer 72 for the second stage of the actuators control is connected to the third backup control link 188, via a control link 190. The control link 190 is connected at a connection point; where said connection point is located near the input to the control computer 66 for the second stage of the actuators control.

The monitoring computer 50 for the third stage of the position calculation for the flight-control surfaces is connected to the third main control link 180 by a control link 192. This control link 192 is connected at a connection point, where said connection point is located near the output from the control computer 44 for the third stage of the position calculation for the flight-control surfaces in order to receive the encoded positions of the flight-control surfaces and verify the integrity thereof.

The control computer 64, 66, 68 for the first, second and third stages of the actuators control are appropriate for sending the driving instructions to the actuators for the aerodynamic flight-control surfaces via communication links not shown.

Sensors, potentiometers and others measure the movements achieved by the actuators and send these measurements to the control computer 64, 66, 68 and to the monitoring computer 70, 72, 74.

The control computers 64, 66, 68 are appropriate for determining the positions of the flight-control surfaces based on the measurements received. The positions of the flight-control surfaces determined in that way are the actual positions of the flight-control surfaces in contrast to the requested positions of the flight-control surfaces sent from the position calculation for the flight-control surfaces 6 to the actuators control 8. The positions of the flight-control surfaces determined in that way are hereafter referred to as actual positions of the flight-control surfaces. The monitoring computers 70, 72, 74 verify the integrity of the calculations done by the control computers 64, 66, 68 in so far as it relates to the actual positions of the flight-control surfaces.

The control computers 64, 66, 68 are suited to encode the actual positions the flight-control surfaces and to send them to the control computers 40, 42, 44 and to the monitoring computers 46, 48, 50 for the position calculation of the flight-control surfaces 6.

The control computers 40, 42, 44 and the monitoring computers 46, 48, 50 for the position calculation of the flight-control surfaces 6 are appropriate for calculating the force controls by comparing the actual positions of the flight-control surfaces to the requested positions the flight-control surfaces in order to obtain the flight trajectories. The control computers 40, 42, 44 are appropriate for encoding the force controls and for sending them to the control computers 16, 18, 20 and to the monitoring computers 22, 24, 26 of the piloting control 4.

The control computers 16, 18, 20 for the piloting control 4 are suited to establish three-axis controls based on the force controls and to send these three-axis controls to three motors not shown.

The control system according to the invention comprises unidirectional communication links with which to transfer data from the actuators control 8 to the position calculation for the flight-control surfaces 6 and from the position calculation from the flight-control surfaces 6 to the piloting control 4. These communication links are shown in FIG. 4. The mesh of these communication links and also the mode of operation of the control and monitoring computers are identical to those described previously for the communication in the opposite direction specifically from the piloting control 4 towards the position calculation for the flight-control surfaces 6 and from the position calculation for the flight-control surfaces 6 toward the actuators control. They will not be described a second time. Only the communication links will be described below. Since the direction of data communication is reversed, the outputs from the computers are in the following description called inputs and the inputs are hereafter called outputs.

In particular, the control computer 64 for the first stage of actuators control is connected to the control computer 40 for the first stage of the position calculation for the flight-control surfaces by a single unidirectional control link, called first main link for feedback from actuators 194.

The first main link for feedback from the actuators 194 is appropriate for transporting actual positions of the flight-control surfaces from the control computer 64 to the control computer 40.

The monitoring computer 70 for the first stage of the actuators control is connected to the first main actuators feedback link 194 by a control link 196 at a connection point, where said connection point is located between the end of the data calculation, processing and encoding chain and the output from the control computer 64 for the first stage of the actuators control.

The encoder 82 is suited for decoding the actual positions of the flight-control surfaces received by the monitoring computer 70 via the control link 196. The monitoring computer 70 is suited for verifying the integrity of the actual positions of the flight-control surfaces decoded by the encoder 82. If the decoded actual positions of the flight-control surfaces are different from the positions of the flight-control surfaces sent by the control computer 64 before coding by the communication link 75 then the control computer 64 and the monitoring computer 70 for the first stage of the actuators control put themselves into failure and the control computer 66 and the monitoring computer 72 for the second stage 12 of the actuators control take over.

Just as for the communication in the opposite direction, the control link 196, the encoder 82 and the monitoring computer 70 for the first stage of the actuators control serve to verify the actual positions of the flight-control surfaces in a format as sent to the position calculation of the flight-control surfaces in such a way that the entire data calculation and processing chain of the control computer 64 is verified, including the encoding part.

The monitoring computer 46 for the first stage for the position calculation for the flight-control surfaces 6 is connected to the first main link for feedback from actuators 194 by a control link 198 at a connection point; where said connection is located at a position near the input of the control computer 40.

Advantageously, a single cable, i.e. the first main unidirectional link for feedback from actuators, extends in the aircraft between the package 77 containing the first stage of the actuators control and the package 49 containing the first stage of the position calculation for the flight-control surfaces and not two cables 116, 118 as in the control system from the prior art.

The encoder 58 decodes the actual positions of the flight-control surfaces received via the control link 198. The monitoring computer 46 for the first stage of the position calculation for the flight-control surfaces uses the actual positions of the flight-control surfaces decoded by the encoder 58 in order to calculate the force commands and confirm the calculations done by the control computer 40 for the first stage of the position calculation for the flight-control surfaces.

The control computer 64 for the first stage of the actuators control is connected to the control computer 42 for the second stage of the position calculation for the flight-control surfaces by a single unidirectional control link, called first auxiliary actuators feedback link 200. The monitoring computer 48 for the second stage of the position calculation for the flight-control surfaces is connected to the first auxiliary actuators feedback link 200 via a control link 202 connected at a connection point, where said connection point is located near the input of the control computer 42 for the second stage of the position calculation for the flight-control surfaces.

The control computer 64 is appropriate for sending the encoded positions of the flight-control surfaces to the control computer 42 and to the monitoring computer 48 for the second stage of the position calculation for the flight-control surfaces via the first auxiliary actuators feedback link 200.

In the same way, the control computer 64 for the first stage of the actuators control is connected to the control computer 44 for the third stage of the position calculation for the flight-control surfaces via one unidirectional control link, called first backup actuators feedback link 204. The monitoring computer 50 for the third stage of the position calculation for the flight-control surfaces is connected to the first backup actuators feedback link 204 by a control link 206 connected at a connection point, where said connection point is located at a location near the input of the control computer 44 for the third stage of the position calculation for the flight-control surfaces.

The control calculator 64 is appropriate for sending the encoded actual positions of the flight-control surfaces to the control computer 44 and to the monitoring computer 50 for the third stage of the position calculation for the flight-control surfaces via the first backup actuators feedback link 204.

The connection drawing and the operating mode described above are also used for the control and monitoring computers for the second stage and third stage of the actuators control and will not be described again. Only the links therebetween will be described below.

The control computer 66 for the second stage of the actuators control is connected to the control computer 42 for the second stage of the position calculation for the flight-control surfaces by a single unidirectional control link, called second main actuators feedback link 208. The monitoring computer 48 for the second stage of the position calculation for the flight-control surfaces is connected to the second main actuators feedback link 208 by a control link 210 connected at a connection point, where said connection point is located near the input of the control computer 42 for the second stage of the position calculation for the flight-control surfaces. The monitoring computer 72 for the second stage of the actuators control is connected to the second main actuators feedback link 208 via a control link 220 at a connection point, where said connection point is located near the input of the control computer 66 for the second stage of the actuators control.

The control computer 66 for the second stage of the actuators control is connected to the control computer 44 for the third stage of the position calculation for the flight-control surfaces by a single unidirectional control link, called second auxiliary actuators feedback link 212.

The monitoring computer 50 for the third stage of the position calculation for the flight-control surfaces is connected to the second auxiliary actuators feedback link 212 by a control link 214 connected at a connection point, where said connection point is located near the input of the control computer 44 for the third stage of the position calculation for the flight-control surfaces.

The control computer 66 for the second stage of the actuators control is connected to the control computer 40 for the first stage of the position calculation for the flight-control surfaces by a single unidirectional control link, called second backup actuators feedback link 216.

The monitoring computer 46 for the first stage of the position calculation for the flight-control surfaces is connected to the second backup actuators feedback link 216 by a control link 218 connected at a connection point, where said connection point is located near the input of the control computer 40 for the first stage of the position calculation for the flight-control surfaces.

The control computer 68 for the third stage of the actuators control is connected to the control computer 44 for the third stage of the position calculation for the flight-control surfaces by a single unidirectional control link, called third main actuators feedback link 222.

The monitoring computer 50 for the third stage of the position calculation for the flight-control surfaces is connected to the third main actuators feedback link 222 by a control link 224 connected at a connection point, where said connection point is located near the input of the control computer 44 for the third stage of the position calculation for the flight-control surfaces.

The monitoring computer 74 for the third stage of the actuators feedback control is connected to the third main actuators feedback link 222 by a control link 226 at a connection point near the input of the control computer 68.

The control computer 68 for the third stage of the actuators control is connected to the control computer 40 for the first stage of the position calculation for the flight-control surfaces via a single unidirectional control link, called third auxiliary actuators feedback link 228. The monitoring computer 46 for the first stage of the position calculation for the flight-control surfaces is connected to the third auxiliary actuators feedback link 228 by means of a control link 230 connected at a connection point, where said connection point is located close to the input of the control computer 40 for the first stage of the position calculation for the flight-control surfaces.

The control computer 68 for the third stage of the actuators control is connected to the control computer 42 for the second stage of the position calculation for the flight-control surfaces via a single unidirectional control link, called third backup actuators feedback link 232. The monitoring computer 48 for the second stage of the position calculation for the flight-control surfaces is connected to the third backup actuators feedback link 232 via a control link 234 connected at a connection point, where said connection point is located near the input of the control computer 42 for the first stage of the position calculation for the flight-control surfaces.

The control computers 64, 66, 68 for the first, second and third stages of actuators control are appropriate for sending the encoded actual positions for the flight-control surfaces to the control computers 40, 42, 44 and to the monitoring computers 46, 48, 50 for the first, second and third stages of the actuators control, via unidirectional control links 194 to 234.

The communication links with which data are sent from the position calculation for the flight-control surfaces to the piloting control 8 are going to be described now.

The control computer 40 for the first stage of the position calculation for the flight-control surfaces is connected to the control computer 16 for the first stage of the piloting control by a single unidirectional control link, called first force feedback link 236.

The monitoring computer 46 for the first stage of the position calculation for the flight-control surfaces is connected to the first force feedback link 236 by a control link 238 at a connection point; where said connection point is located between the end of the data calculation, processing and encoding chain and the output of the control computer 40 for the first stage of the position calculation for the flight-control surfaces.

The encoder 58 is suited for decoding the force commands received by the monitoring computer 46 via the control link 238. The monitoring computer 46 is suited for confirming the integrity of the force controls decoded by the encoder 58. If the decoded force controls are different from the force controls sent by the control computer 40 before coding by the communication link 51, then the control computer 40 and the monitoring computer 46 for the first stage of the position calculation for the flight-control surfaces put themselves into failure and the control computer 42 and the monitoring computer 48 for the second stage 12 of the position calculation for the flight-control surfaces take over.

The monitoring computers 22, 24, 26 of the first, second and third stages of the piloting control and the control computers 18, 20 for the second and third stage of the piloting control are connected to the first link for force feedback 236 by control link 240 which extends inside the stick 9 between the set of printed circuit boards for the stick.

The control computer 40 is suited to transfer the force controls to the control computers 16, 18, 20 and to the monitoring computers 22, 24, 26 for the piloting control.

The control computer 42 for the second stage of the position calculation for the flight-control surfaces is connected to the control computer 18 for the second stage of the piloting control by a single unidirectional control link, called second force feedback link 242.

The monitoring computer 48 for the second stage of the position calculation for the flight-control surfaces is connected to the second force feedback link 242 by a control link 244 at a connection point; where said connection point is located between the end of the data calculation, processing and encoding chain and the output of the control computer 42 for the second stage of the position calculation for the flight-control surfaces.

The monitoring computer 48 is suited for confirming the integrity of the force controls decoded by the encoder 60.

The monitoring computers 22, 24, 26 of the first, second and third stages of the piloting control and the control computers 20, 16 for the second and first stage of the piloting control are connected to the second link for force feedback 242 by control link 246 which extends inside the stick 9 between the set of printed circuit boards for the stick.

The control computer 42 is suited to transfer the force controls to the control computers 16, 18, 20 and to the monitoring computers 22, 24, 26 for the piloting control.

The control computer 44 for the third stage of the position calculation for the flight-control surfaces is connected to the control computer 20 for the third stage of the piloting control by a single unidirectional control link, called third force feedback link 248.

The monitoring computer 50 for the third stage of the position calculation for the flight-control surfaces is connected to the third force feedback link 248 by a control link 250 at a connection point; where said connection point is located between the end of the data calculation, processing and encoding chain and the output of the control computer 44 for the third stage of the position calculation for the flight-control surfaces.

The monitoring computer 50 is suited for confirming the integrity of the force controls decoded by the encoder 62.

The monitoring computers 22, 24, 26 of the first, second and third stages of the piloting control and the control computers 16, 18 for the first and second stages of the piloting control are connected to the third link for force feedback by control link 252 which extends inside the stick 9 between the set of printed circuit boards for the stick.

The control computer 44 is suited to transfer the force controls to the control computers 16, 18, 20 and to the monitoring computers 22, 24, 26 for the piloting control.

The invention claimed is:

1. Fly-by-wire control system for aircraft, the control system comprising:
   aerodynamic flight-control surfaces,
   a stick for piloting said aerodynamic flight-control surfaces,
   a piloting control comprising a first stage and a second stage each comprising:
      a control computer configured to determine positions of the stick, where the control computer comprises an encoder configured to generate encoded stick positions; and
      a monitoring computer configured to verify an integrity of the stick positions determined by the control computer;
   a position calculator for the flight-control surfaces comprising a first stage and a second stage, each comprising:
      a control computer configured to calculate positions of the flight-control surfaces using encoded stick positions; and
      a monitoring computer configured to verify an integrity of the positions of the flight-control surfaces calculated by the control computer;
   a first unidirectional link for piloting controls connecting the control computer for the first stage of the piloting control to the control computer for the first stage of the calculator for the flight-control surfaces;
   a second unidirectional link for piloting controls connecting the control computer for the second stage of the piloting control to the control computer for the second stage of the calculator for the flight-control surfaces;
   wherein the piloting control comprises a third stage comprising:
      a control computer configured to determine the positions of the stick, where the control computer comprises an encoder configured to generate encoded stick positions; and
      a monitoring computer configured to verify the integrity of the stick positions determined by the control computer;
   wherein the position calculator for the flight-control surfaces comprises a third stage comprising:
      a control computer configured to calculate positions of the flight-control surfaces using encoded stick positions; and
      a monitoring computer configured to verify the integrity of the positions of the flight-control surfaces calculated by the control computer;
   and wherein the control system comprises a third unidirectional link for piloting controls connecting the control computer for the third stage of the piloting control to the control computer for the third stage of the position calculator for the flight-control surfaces;
   and wherein the first unidirectional link is the only control link configured to send encoded stick positions from the control computer for the first stage of the piloting control to the control computer for the first stage of the position calculator for the flight-control surfaces;
   where the second unidirectional link is the only control link configured to send encoded stick positions from the control computer for the second stage of the piloting control to the control computer for the second stage of the position calculator for the flight-control surfaces;
   where the third unidirectional link is the only control link appropriate for sending encoded stick positions from the control computer for the third stage of the piloting control to the control computer for the third stage of the position calculator for the flight-control surfaces;
   where the monitoring computer for the first stage, the monitoring computer for the second stage and the monitoring computer for the third stage of the position calculator for the flight-control surfaces are connected respectively to the first, second and third unidirectional links, via control links;
   and in which the monitoring computers for the piloting control each comprise one encoder configured to decode the encoded stick positions; where the monitoring computers for the first stage, second stage and third stage of the piloting control are connected respectively to the first, second and third unidirectional links via control links; where the monitoring computers for the piloting control are configured to verify the integrity of the stick positions decoded by the encoders.

2. Control system according to claim 1, wherein the encoders of the control computers for the piloting control and the encoders of the monitoring computers for the piloting control are configured to implement a first cyclic redundancy check on a first data packet representative of the stick positions and a second cyclic redundancy check on a second data packet representative of the stick positions, where the second data packet comprises several first data packets.

3. Control system according to claim 1, wherein it comprises:
   a single unidirectional control link for piloting, referred to as first auxiliary link for piloting, configured to send the encoded stick positions from the control computer for the first stage of the piloting control to the control computer for the second stage of the position calculator for the flight-control surfaces;
   a single unidirectional control link for piloting, referred to as first backup link for piloting, configured to send the encoded stick positions from the control computer for the first stage of the piloting control to the control computer for the third stage of the position calculator for the flight-control surfaces.

4. Control system according to claim 3, wherein the monitoring computer for the second stage and the monitoring computer for the third stage of the position calculator for the flight-control surfaces are connected respectively to the first auxiliary link for piloting and to the first backup link for piloting by control links.

5. Control system according to claim 1, wherein it comprises:
- a single unidirectional control link for piloting, referred to as second auxiliary link for piloting, appropriate for sending the encoded stick positions from the control computer for the second stage of the piloting control to the control computer for the third stage of the position calculator for the flight-control surfaces;
- a single unidirectional control link for piloting, referred to as second backup link for piloting, configured to send the encoded stick positions from the control computer for the second stage of the piloting control to the control computer for the first stage of the position calculator for the flight-control surfaces.

6. Control system according to claim 5, wherein the monitoring computer for the third stage and the monitoring computer for the first stage of the position calculator for the flight-control surfaces are connected respectively to the second auxiliary link for piloting and to the second backup link for piloting by control links.

7. Control system according to claim 1, wherein it comprises:
- a single unidirectional control link for piloting, referred to as third auxiliary link for piloting, configured to send the encoded stick positions from the control computer for the third stage of the piloting control to the control computer for the first stage of the position calculator for the flight-control surfaces;
- a single unidirectional control link for piloting, referred to as third backup link for piloting, configured to send the encoded stick positions from the control computer for the third stage of the piloting control to the control computer for the second stage of the position calculator for the flight-control surfaces.

8. Control system according to claim 7, wherein the monitoring computer for the first stage and the monitoring computer for the second stage of the position calculator for the flight-control surfaces are connected respectively to the third auxiliary link for piloting and to the third backup link for piloting by control links.

9. Control system according to claim 1, wherein the position calculator for the flight-control surfaces is configured to receive actual positions for the flight-control surfaces, where at least one control computer and one monitoring computer for the position calculator for the flight-control surfaces are configured to calculate force controls as a function of the received actual positions of the flight-control surfaces, and wherein the control system comprises:
- a single unidirectional control link for force feedback, referred to as first force feedback link, configured to send the force controls from the control computer for the first stage of the position calculator for the flight-control surfaces to the control computer for the first stage of the piloting control;
- a single unidirectional control link for force feedback, referred to as second force feedback link, configured to send the force controls from the control computer for the second stage of the position calculator for the flight-control surfaces to the control computer for the second stage of the piloting control;
- a single unidirectional control link for force feedback, referred to as third force feedback link, configured to send the force controls from the control computer for the third stage of the position calculator for the flight-control surfaces to the control computer for the third stage of the piloting control.

10. Control system according to claim 9, wherein the control computers for the position calculator for the flight-control surfaces each comprise one encoder for encoding the force controls, and in that the monitoring computers for the position calculator for the flight-control surfaces each comprise an encoder configured to decode the encoded force controls; where the encoders for the monitoring computers for the first stage, second stage and third stage of the position calculator for the flight-control surfaces are connected respectively to the first, second and third force feedback links via control links; where the monitoring computers for the position calculator for the flight-control surfaces are configured to verify the integrity of the force controls decoded by the encoders.

11. Control system according to claim 9, wherein the monitoring computer for the first stage of the piloting control, the control computer and the monitoring computer for the second stage of the piloting control, and the control computer and the monitoring computer for the third stage of the piloting control are each connected to the first force feedback link via control links;
- where the monitoring computer for the second stage of the piloting control, the control computer and the monitoring computer for the first stage of the piloting control, and the control computer and the monitoring computer for the third stage of the piloting control are each connected to the second force feedback link via control links;
- where the monitoring computer for the third stage of the piloting control, the control computer and the monitoring computer for the first stage of the piloting control, and the control computer and the monitoring computer for the second stage of the piloting control are each connected to the third force feedback link via control links.

12. Fly-by-wire control system for aircraft, the control system comprising:
- aerodynamic flight-control surfaces,
- actuators suited to drive said aerodynamic flight-control surfaces based on driving instructions, and a stick appropriate for being moved for piloting the driving of said aerodynamic flight-control surfaces,
- a position calculator for the flight-control surfaces comprising a first stage and a second stage, each comprising:
  - a control computer configured to receive positions from the stick and configured to calculate positions for the flight-control surfaces based on the positions of the stick, where the control computer comprises an encoder configured to generate encoded positions of the flight-control surfaces; and
  - a monitoring computer configured to verify an integrity of the positions of the flight-control surfaces calculated by the control computer;
- an actuators control comprising a first stage and a second stage each comprising:
  - a control computer configured to determine driving instructions for the actuators for aerodynamic flight-control surfaces based on the positions of the flight-control surfaces; and
  - a monitoring computer suited to verify an integrity of the driving instructions determined by the control computer;
- a first unidirectional control link for position of the flight-control surfaces connecting the control computer for the first stage of the position calculator for the flight-control surfaces to the control computer for the first stage of the actuators control;
a second unidirectional control link for position of the flight-control surfaces connecting the control computer for the second stage of the position calculator for the flight-control surfaces to the control computer for the second stage of the actuators control;
wherein the position calculator for the flight-control surfaces comprises a third stage comprising:
a control computer configured to receive positions from the stick and for calculating positions for the flight-control surfaces based on the positions of the stick, where the control computer comprises an encoder configured to generate encoded positions of the flight-control surfaces; and
a monitoring computer configured to verify the integrity of the positions of the flight-control surfaces calculated by the control computer;
wherein the actuators control comprises a third stage comprising:
a control computer configured to calculate driving instructions based on encoded positions of the flight-control surfaces; and
a monitoring computer configured to verify the integrity of the driving instructions calculated by the control computer;
and wherein the control system comprises:
a third unidirectional control link for position of the flight-control surfaces connecting the control computer for the third stage of the position calculator for the flight-control surfaces to the control computer for the third stage of the actuators control;
and wherein the first unidirectional link is the only control link configured to send encoded positions of the flight-control surfaces from the control computer for the first stage of the position calculator for the flight-control surfaces to the control computer for the first stage of the actuators control;
where the second unidirectional link is the only control link configured to send encoded positions of the flight-control surfaces from the control computer for the second stage of the position calculator for the flight-control surfaces to the control computer for the second stage of the actuators control;
where the third unidirectional link is the only control link configured to send encoded positions of the flight-control surfaces from the control computer for the third stage of the position calculator for the flight-control surfaces to the control computer for the third stage of the actuators control;
where the monitoring computers for the first stage, second stage and third stage of the position calculator for the flight-control surfaces are each connected respectively to the first, second and third control links via control links for receiving encoded positions of the flight-control surfaces;
where the monitoring computers for the position calculator for the flight control surfaces each comprise an encoder configured to decode the encoded flight control surfaces positions;
where the monitoring computers for the position calculator for the flight-control surfaces are configured to verify the integrity of the positions of the flight-control surfaces decoded by the encoders.

13. Control system according to claim 12, wherein the encoders of the control computer for the position calculator for the flight-control surfaces and the encoders of the monitoring computer for the actuators are configured to implement a first cyclic redundancy check on a first data packet representative of the stick positions and a second cyclic redundancy check on a second data packet representative of the stick positions, where the second data packet comprises several first data packets.

14. Control system according to claim 12, comprising:
a first auxiliary unidirectional control link configured to send the encoded positions of the flight-control surfaces from the control computer for the first stage of the position calculator for the flight-control surfaces to the control computer for the second stage of the actuators control;
a first backup unidirectional control link configured to send the encoded positions of the flight-control surfaces from the control computer for the first stage of the position calculator for the flight-control surfaces to the control computer for the third stage of the actuators control.

15. Control system according to claim 14, wherein the monitoring computer for the second stage and the monitoring computer for the third stage of the actuators control are connected respectively to the first auxiliary unidirectional control link and to the first backup unidirectional control link via control links.

16. Control system according to claim 12, comprising:
a second auxiliary unidirectional control link configured to send the encoded positions of the flight-control surfaces from the control computer for the second stage of the position calculator for the flight-control surfaces to the control computer for the third stage of the actuators control;
a second backup unidirectional control link configured to send the encoded positions of the flight-control surfaces from the control computer for the second stage of the position calculator for the flight-control surfaces to the control computer for the first stage of the actuators control.

17. Control system according to claim 16, wherein the monitoring computer for the third stage and the monitoring computer for the first stage of the actuators control are connected respectively to the second auxiliary unidirectional control link and to the second backup unidirectional control link via control links.

18. Control system according to claim 12, comprising:
a third auxiliary unidirectional control link configured to send the encoded positions of the flight-control surfaces from the control computer for the third stage of the position calculator for the flight-control surfaces to the control computer for the first stage of the actuators control;
a third backup unidirectional control link configured to send the encoded positions of the flight-control surfaces from the control computer for the third stage of the position calculator for the flight-control surfaces to the control computer for the second stage of the actuators control.

19. Control system according to claim 18, wherein the monitoring computer for the first stage and the monitoring computer for the second stage of the actuators control are connected respectively to the third auxiliary unidirectional control link and to the third backup unidirectional control link via control links.

20. Control system according to claim 19, wherein the monitoring computer for the first stage of the position calculator for the flight-control surfaces is connected to the first feedback unidirectional control link for feedback from actuators via a control link;

the monitoring computer for the second stage of the position calculator for the flight-control surfaces is connected to the second feedback unidirectional control link for feedback from actuators via a control link;

the monitoring computer for the third stage of the position calculator for the flight-control surfaces is connected to the third feedback unidirectional control link for feedback from actuators via a control link.

21. Control system according to claim 12, comprising the control computers and the monitoring computers for the first, second and third stages of the actuators control are configured to determine actual positions of the flight-control surfaces, and wherein the control system comprises:

one first feedback unidirectional control link for feedback from actuators configured to send the actual positions of the flight-control surfaces from the control computer for the first stage of the actuators control to the control computer for the first stage of the position calculator for the flight-control surfaces;

one second feedback unidirectional control link for feedback from actuators configured to send the actual positions of the flight-control surfaces from the control computer for the second stage of the position calculator for the flight-control surfaces to the control computer for the second stage of the actuators control;

one third feedback unidirectional control link for feedback from actuators configured to send the actual positions of the flight-control surfaces from the control computer for the third stage of the actuators control to the control computer for the third stage of the position calculator for the flight-control surfaces.

22. Control system according to claim 21, wherein the control computers for the actuators control each comprise one encoder configured to generate encoded positions of the flight-control surfaces and wherein the monitoring computers for the first stage, second stage and third stage of the actuators control are connected respectively to the first, second and third feedback unidirectional control links for feedback from actuators via control links; the monitoring computers for the actuators control each comprise an encoder configured to decode the encoded actual positions of the flight-control surfaces; where the monitoring computers for the actuators control are configured to verify the integrity of the actual positions of the flight-control surfaces decoded by the encoders.

23. Control system according to claim 12, comprising:

one first auxiliary feedback unidirectional control link for feedback from actuators configured to send the encoded actual positions of the flight-control surfaces from the control computer for the first stage of the actuators control to the control computer for the second stage of the position calculator for the flight-control surfaces;

one first feedback backup unidirectional control link for feedback from actuators configured to send the encoded actual positions of the flight-control surfaces from the control computer for the first stage of the actuators control to the control computer for the third stage of the position calculator for the flight-control surfaces.

24. Control system according to claim 23, wherein the monitoring computer for the second stage and the monitoring computer for the third stage of position calculator for the flight-control surfaces are connected respectively to the first auxiliary feedback unidirectional control link for feedback from actuators and to the first feedback backup unidirectional control link for feedback from actuators via control links.

25. Control system according to claim 12, comprising:

one second auxiliary feedback unidirectional control link for feedback from actuators configured to send the encoded actual positions of the flight-control surfaces from the control computer for the second stage of the actuators control to the control computer for the third stage of the position calculator for the flight-control surfaces;

one second feedback backup unidirectional control link for feedback from actuators configured to send the encoded actual positions of the flight-control surfaces from the control computer for the second stage of the actuators control to the control computer for the first stage of the position calculator for the flight-control surfaces.

26. Control system according to claim 25, wherein the monitoring computer for the third stage and the monitoring computer for the first stage of position calculator for the flight-control surfaces are connected respectively to the second auxiliary feedback unidirectional control link for feedback from actuators and to the second feedback backup unidirectional control link for feedback from actuators by control links.

27. Control system according to claim 25, wherein the monitoring computer for the first stage and the monitoring computer for the second stage of position calculator for the flight-control surfaces are connected respectively to the third auxiliary feedback unidirectional control link for feedback from actuators and to the third feedback backup unidirectional control link for feedback from actuators via control links.

28. Control system according to claim 12, comprising:

one third auxiliary feedback unidirectional control link for feedback from actuators configured to send the encoded actual positions of the flight-control surfaces from the control computer for the third stage of the actuators control to the control computer for the first stage of the position calculator for the flight-control surfaces;

one third feedback backup unidirectional control link for feedback from actuators configured to send the encoded actual positions of the flight-control surfaces from the control computer for the third stage of the actuators control to the control computer for the second stage of the position calculator for the flight-control surfaces.

* * * * *